US 6,708,568 B2

(12) United States Patent
Gleeson et al.

(10) Patent No.: US 6,708,568 B2
(45) Date of Patent: Mar. 23, 2004

(54) COMBUSTION CHAMBER DYNAMIC PRESSURE TRANSDUCER TEE PROBE HOLDER AND RELATED METHOD

(75) Inventors: Eamon P. Gleeson, Atlanta, GA (US); Fei Han, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/064,199

(22) Filed: Jun. 20, 2002

(65) Prior Publication Data

US 2003/0093999 A1 May 22, 2003

Related U.S. Application Data

(63) Continuation-in-part of application No. 09/989,102, filed on Nov. 21, 2001.

(51) Int. Cl.[7] .................................................. G01L 7/00
(52) U.S. Cl. ........................ 73/756; 73/700; 73/861.08
(58) Field of Search ...................... 73/700–756, 861.08, 73/861.47, 115–117.4

(56) References Cited

U.S. PATENT DOCUMENTS 3,943,759 A 3/1976 Kato et al.

*Primary Examiner*—Edward Lefkowitz
*Assistant Examiner*—Jermaine Jenkins
(74) *Attorney, Agent, or Firm*—Nixon & Vanderhye P.C.

(57) ABSTRACT

A dynamic pressure probe includes a holder body having a first passage therein adapted to receive a pressure signal, a pressure sensor including at least a pressure sensing portion located within a sleeve seated within a pressure sensor housing portion, the sleeve engaged with a wall of the housing portion; the pressure sensor including a diaphragm having one face exposed to a pressure chamber within the sleeve between the pressure sensor and the wall; wherein an aperture in the wall of the housing connects the pressure chamber to the first passage; and wherein the first passage continues axially beyond the aperture in a flow direction an acoustic damping coil wound about a vertical axis.

18 Claims, 4 Drawing Sheets

COMBUSTION CHAMBER DYNAMIC PRESSURE TRANSDUCER TEE PROBE HOLDER AND RELATED METHOD

CROSS REFERENCE TO RELATED APPLICATIONS

This is a continuation-in-part of application Ser. No. 09/989,102 filed Nov. 21, 2001.

BACKGROUND OF INVENTION

This invention relates to a device and a method for measuring the dynamic pressure in the combustion chamber of, for example, a gas turbine machine.

As part of the monitoring controls and diagnostic tools for an operating combustion system in a rotary machine such as a gas turbine, it is necessary to measure and acquire various data including combustion chamber dynamic pressure. This data is used to confirm proper operational health of the combustion system, and is also used to tune the gas turbine engine so that it is operating with an appropriate balance between combustion dynamics and emissions. Measuring dynamic pressure directly in a combustion chamber requires a sensor that functions in operating environments having temperatures in the range of 2000–3000° F. Currently, existing dynamic pressure probes are designed to withstand no more than about 1000° F. As a result, existing combustion dynamic pressure measurement methods do not utilize sensors located directly in the combustion chamber. Rather, current systems use metal tubing called wave guides to transmit the pressure signal from the combustion chamber to a remotely located dynamic pressure sensor. The factors that affect the degree of signal attenuation for these systems include the following:

1. The internal diameter of the tubing.
2. The length of the tubing.
3. The temperature profile within the tubing.
4. The static pressure within the tubing.
5. The frequency content of dynamic pressure signature.

With these systems, a damping coil wound around a horizontal axis is used to prevent the formation of standing waves in the measurement system. This type of system, however, results in the formation of condensate in the horizontal wound damping coil. Condensation build up in the coils results in standing waves being formed in the tubing which attenuates the true source signal and prevents it from being measured accurately. To overcome this problem, current systems have to be periodically purged to remove the condensate from the damping coils.

In addition, the long length of the metal tubing from the combustion chamber to the remotely located sensor results in significant attenuation of the pressure signal, and thus it is not possible to measure the true dynamic pressure of the combustion system with this approach. The signal attenuation resulting from this type of system increases as the frequency of the signal being measured increases.

Accordingly, a probe holder is needed that isolates the dynamic pressure sensor from the temperature of the combustion chamber, while still allowing the sensor to observe in a more accurate manner the dynamic pressure characteristic of the combustion chamber. In other words, this needs to be done in a manner which will not introduce any standing waves, resonances or signal attenuations of the combustion chamber dynamic pressure signals, and that will not result in the formation of condensation in the measurement system.

SUMMARY OF INVENTION

This invention enables accurate and continuous measurement of the dynamic pressure inside an individual combustion chamber. In the exemplary embodiment, a Tee probe holder is employed that allows the pressure sensor to measure dynamic pressure characteristics in a combustion chamber, without being exposed to the high temperature of the combustion chamber. Specifically, the holder is designed to locate the dynamic pressure sensor in a unique configuration with respect to the pressure signal from the combustion system. In the exemplary embodiment, the Tee probe holder includes a holder body that has a concentric axial bore hole that "transmits" the combustion chamber dynamic pressure signal to a pressure chamber and pressure sensor that are located in a housing portion of the holder body that is substantially perpendicular to the pressure signal passage.

The pressure signal passage itself extends beyond the pressure sensor and communicates with a metal tube or waveguide having an identical inside diameter that transmits the signal to an acoustic damping system.

The sensing portion of the sensor and an associated diaphragm are sealed within a metal sleeve that is, in turn, supported in the housing portion, with a relatively thin wall separating the sleeve from the pressure sensing passage. An aperture in the wall connects a low volume pressure chamber on one side of the wall, i.e., on the side closest the pressure sensor, to the pressure signal passage.

The forward or sensing portion of the sensor is precision fit within the sleeve, i.e., the sleeve inner diameter and sensor outer diameter are machined to be substantially perfectly round, with a very small clearance that substantially creates a seal between the sleeve and the sensor. In order to allow movement of the sensor diaphragm, however, a larger clearance is provided at the diaphragm by, for example, making the outer diameter of the diaphragm end of the sensor smaller, or by making the inner diameter of the sleeve larger.

O-rings are fitted at each end of the sleeve to attain a substantially perfect seal at opposite ends of the sleeve thereby eliminating any leakage from the pressure chamber.

Mounting of the Tee probe holder in the outer wall of the combustion chamber is achieved using a compression fitting. The depth of the Tee Probe Holder in the combustion chamber is set such that the tip of the probe is flush with the inside of the combustion liner.

In addition, this invention transmits the dynamic pressure signal from the high temperature environment of the combustion chamber via a wave guide to the bottom side of one or more damping coils wound in a helical shape about a vertical axis. The damping coil is made of metal tubing, preferably with the same internal diameter as the metal tubing in the wave guide. The distance from the measurement point to the end of the acoustic damping system (i.e., the remote end of the one or more damping coils) is sufficiently long to insure the signal will be completely damped away before it can reflect and travel back to the measurement point.

By winding the damping coil around a vertical axis, the metal tubing has a continuous downward slope back toward the source of dynamic pressure. As a result, condensation build-up in the system is minimized if not eliminated, since the condensate would simply flow out of the coil under gravity.

In addition, a second passage in the Tee probe holder may extend parallel to the dynamic pressure signal passage and is adapted to open into the radial passage between the outer wall of the combustor and the combustion liner. This passage picks up compressor discharge air and supplies it to the acoustic damping system to further aid in the elimination of any condensation in the attenuation coil where the pressure signal is damped.

The arrangement described above ensures that no standing waves (from condensation), resonances or signal attenuations negatively impact the combustion chamber dynamic pressure signal.

Accordingly, in one aspect, the invention relates to a dynamic pressure probe comprising a holder body having a first passage therein adapted to receive a pressure signal, a pressure sensor including at least a pressure sensing portion located within a sleeve seated within a pressure sensor housing portion, the sleeve engaged with a wall of the housing portion; the pressure sensor including a diaphragm having one face exposed to a pressure chamber within the sleeve between the pressure sensor and the wall; wherein an aperture in the wall of the housing connects the pressure chamber to the first passage; and wherein the first passage continues axially beyond the aperture in a flow direction an acoustic damping coil wound about a vertical axis.

In another aspect, the invention relates to a dynamic pressure probe comprising a holder body having a first passage therein adapted to receive a pressure signal, a pressure sensor including at least a pressure sensing portion located within a sleeve seated within a pressure sensor housing portion, the sleeve engaged with a wall of the housing portion; the pressure sensor including a diaphragm having one face exposed to a pressure chamber within the sleeve between the pressure sensor and the wall; wherein an aperture in the wall of the housing connects the pressure chamber to the first passage; and wherein heating means are provided for raising the temperatures inside the damping coil sufficiently to prevent condensation from forming inside the coil.

In another aspect, the invention relates to a method of obtaining a dynamic pressure signal from a combustor comprising a) supplying a dynamic pressure signal from the combustor through a first passage, the first passage exposed to a mutually perpendicularly arranged sensor diaphragm remote from the combustor; b) transmitting the pressure signal beyond the sensor diaphragm to a signal damping mechanism including a helical coil wound about a vertical axis; and c) supplying compressor discharge air to the signal damping mechanism to remove any condensation therein.

DETAILED DESCRIPTION

Figure 1:
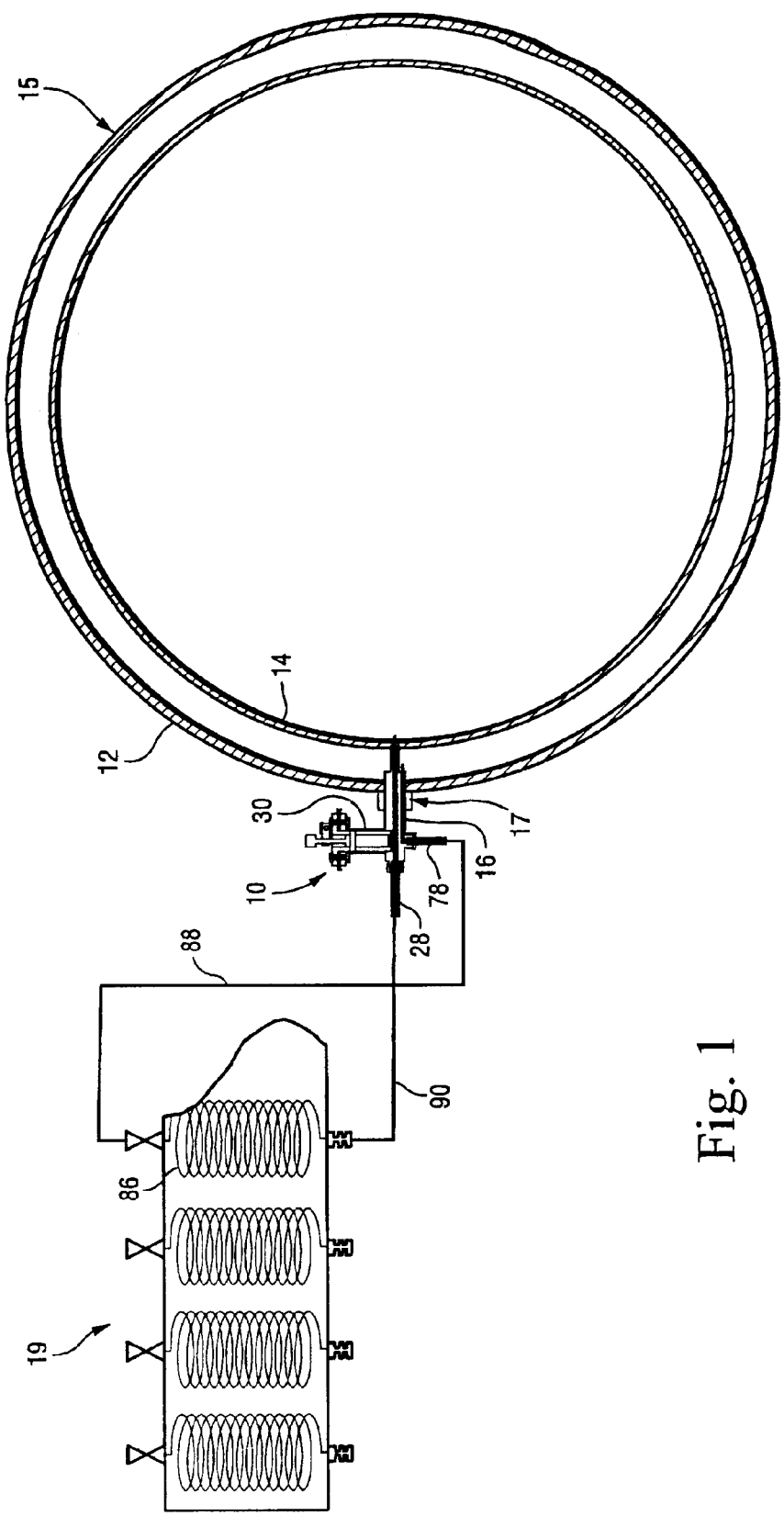
FIG. 1 is a section view taken through a combustor, and illustrating a pressure dynamic sensor mounted to the outer combustor wall by means of a Tee probe holder in accordance with an exemplary embodiment of the invention.

With reference to FIG. 1, the Tee probe holder 10 is shown attached to the outer wall or casing 12 of a combustor 15 via a conventional compression fitting 17. As explained further below, the forward tip of the holder 10 is seated in an aperture in the combustion liner 14 that is concentric with, and spaced radially inward of, the outer wall or casing 12. The dynamic pressure signal is transmitted through a passage 18 in the holder to a sensor located within the holder but relatively remote from the forward tip, as described in further detail below. The pressure signal is damped in a nearby acoustic damping system 19, also described further below.

Figure 2:
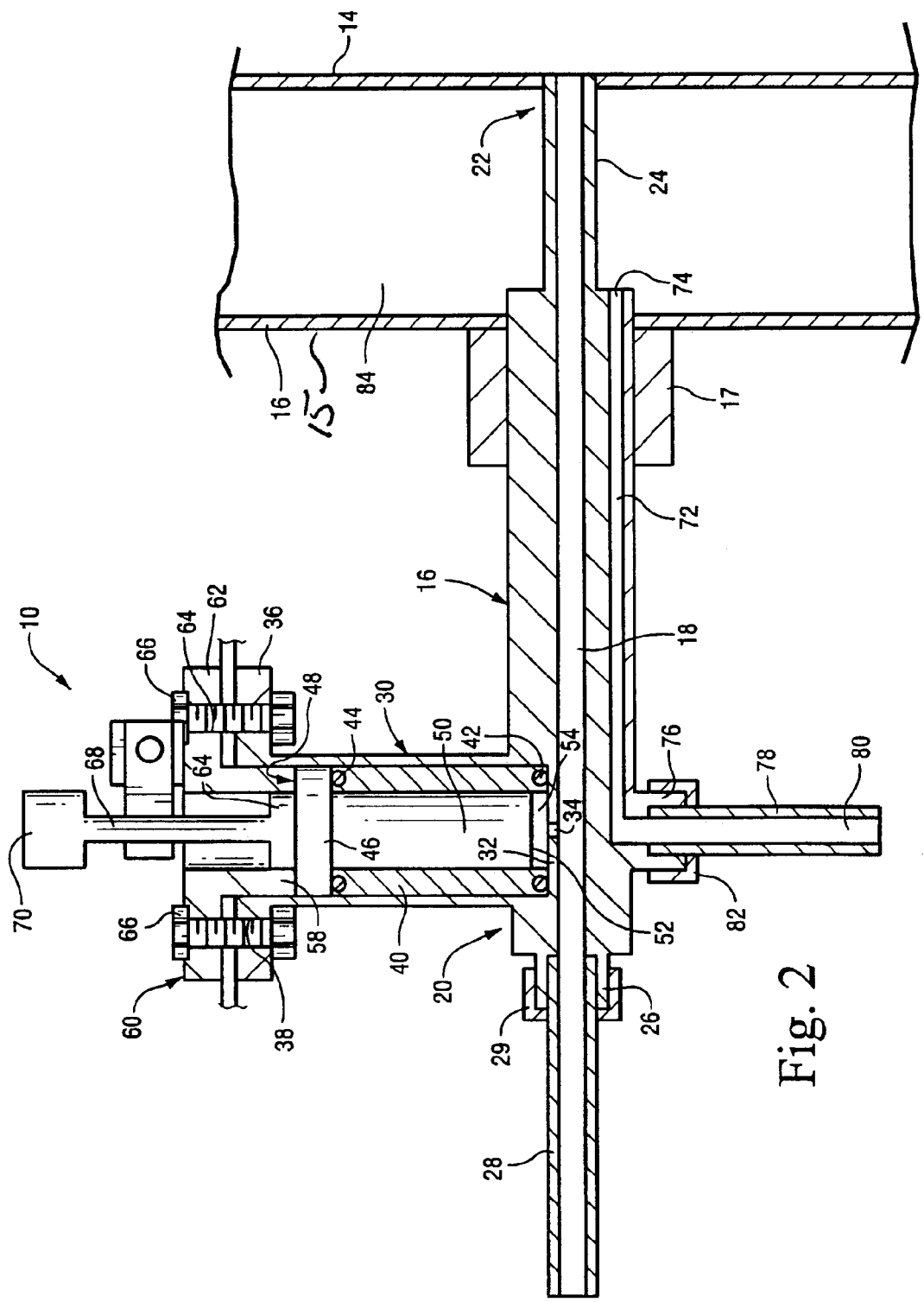
FIG. 2 is an enlarged cross-section of the Tee probe holder and pressure sensor assembly component taken from FIG. 1.

With reference now also to FIG. 2, the Tee probe holder 10 includes a generally cylindrical or other suitably shaped holder body 16 formed with a first through-bore or passage 18 extending from a rearward end 20 to a forward end 22 of the holder body. The forward end 22 includes a reduced thickness forward extension 24 and the rearward end 20 includes a reduced thickness rearward extension 26. The forward end is adapted to project through an aperture in the combustor liner 14 so that the inlet to passage 18 is exposed to the combustor dynamic pressure. Passage 18 is counterbored in the rearward extension 26 to permit attachment (via a conventional compression fitting 29) of a metal tube or waveguide 28 having an inside diameter equal to the inside diameter of bore 18, SO that the inside diameter of the bore 18 and tube 28 is uniform throughout.

A sensor housing portion 30 of the holder body 16 is joined to (or is integral with) the holder body adjacent the rearward end 20, and extends perpendicular thereto. The housing portion 30 is formed with a cylindrical interior that extends into the wall of the body 16, such that only a relatively small thickness wall 32 separates the interior of the housing portion from the through bore or first passage 18, with a pressure feed hole or aperture 34 centrally located in the wall 32.

The outer end of the housing portion 30 includes a radial flange 36 with a plurality of screw holes 38 therein. Within the housing portion 30, a metal sleeve 40 is fitted such that the base of the sleeve 40 is seated on the bottom wall 32 of the housing portion 30. An O-ring 42 seated in a groove 43 seals the sleeve relative to wall 32, and a second O-ring 44 at the opposite or outer end of the sleeve 40, seated in a groove 45, seals the sleeve relative to a radial flange 46 of a sensor 48.

The inner or sensing portion 50 of the sensor 48 is received within the sleeve 40 with its innermost end, defined by diaphragm 52, spaced from bottom wall 32 of the housing portion 30, establishing a pressure chamber 54 between the diaphragm 52 and the wall 32. Thus, diaphragm 52 is exposed to the chamber 54. Note also that the engagement of flange 46 with the sleeve 40 determines the depth of the pressure chamber 54.

Figure 3:
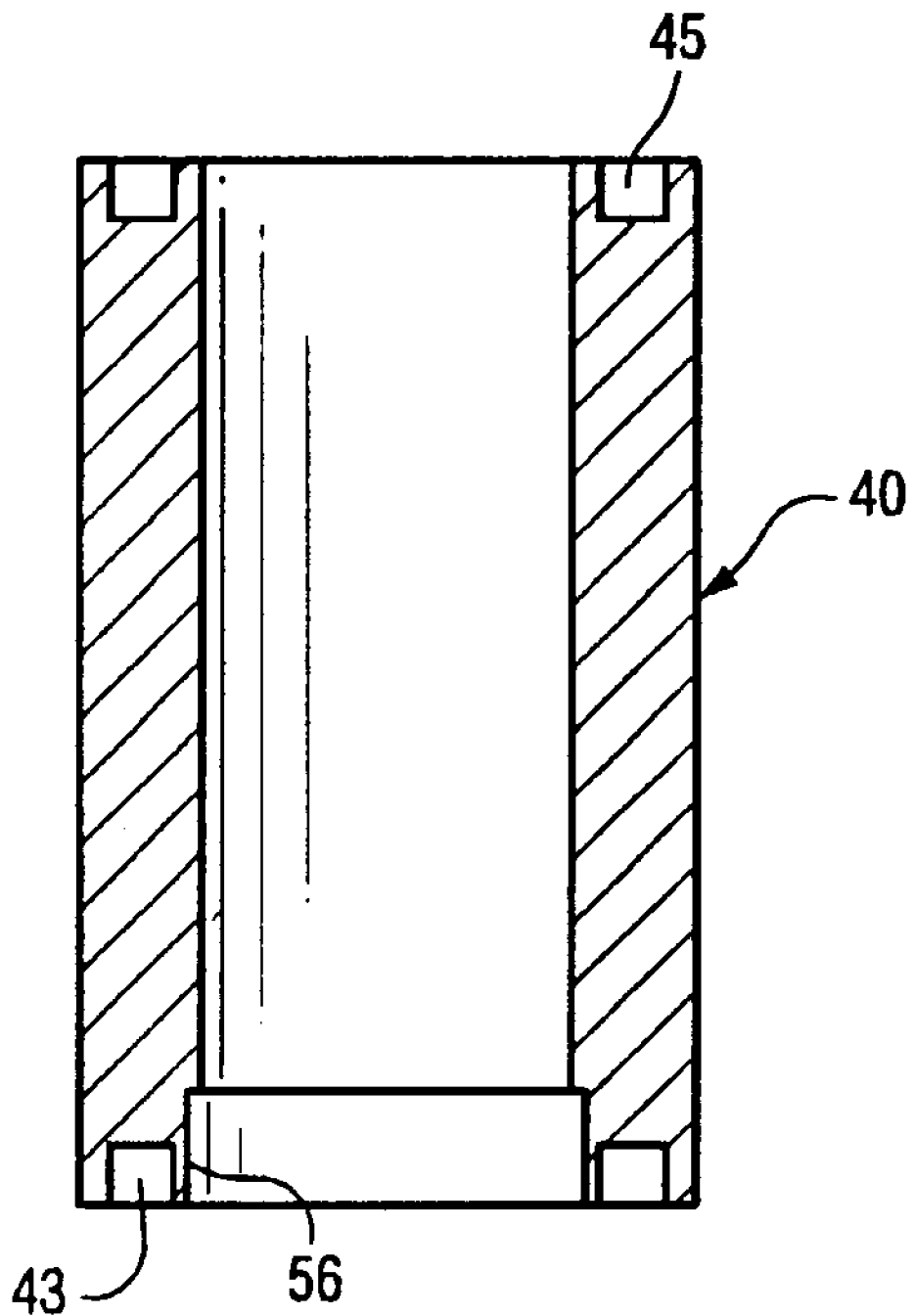
FIG. 3 is a section view of a sensor supporting sleeve taken from FIG. 2.

There is a precision fit between the inside diameter of the sleeve 40 and the outside diameter of the sensing portion 50 of the sensor 48, with a very small clearance that effectively creates a seal between the sleeve 40 and portion 50 of the sensor. In order to ensure that movement of the diaphragm 52 is not restricted by the sleeve 40, the inner diameter of the inner end 56 of the sleeve is greater than the inner diameter of the remainder of the sleeve, as shown in FIG. 3. As a result, the face of the diaphragm 52 is free to oscillate in response to a dynamic pressure signal without any frictional damping caused by the metal sleeve 40. It will be appreciated that the outer diameter of the inner end of the sensing portion adjacent diaphragm 52 may be reduced slightly, as an alternative to increasing the inner diameter of the sleeve.

The O-ring seals 42 and 44 attain a substantially perfect seal with respect to the sensor pressure chamber 54, eliminating any leakage from the pressure chamber along wall 32 or along the clearance between sleeve 40 and portion 50 of the sensor that might otherwise escape along flange 46. In the preferred embodiment, the O-rings are made of Kalrez, and are designed to operate at temperatures up to 600° F. The pressure signal is thus confined to the pressure chamber 54 and damping of the signal along the above mentioned surfaces is prevented.

The Tee holder pressure chamber 54 is designed to have a very small volume. This insures that the acoustic resonance frequency of this cavity or chamber is shifted to a frequency that is higher than the frequency range of interest, i.e., the frequency range of the combustor dynamic pressure signal. The hole 34 that feeds the dynamic pressure signal from the dynamic pressure signal passage 18 to the tee holder pressure chamber 54 is also very small in diameter and short in axial length. Again, this design insures that the resonance frequency of this chamber is much higher than the frequency range of interest.

A cylindrical tubular portion 58 of a flange connector 60 fits within the upper end of sensor housing portion 30, with a radial flange portion 62 formed with holes 64 that are alignable with holes 38 in flange 36 such that screws or other suitable fasteners 66 may be used to tighten the flange connector 60 against the radial flange 46 of the sensor 48, thus ensuring that the sensor 48 is secured within the housing portion 30. The sensor 48 also includes a cable connector rod 68 that extends out of the connector 60 and terminates at a cable connector 70 to which a cable (not shown) is attached, connecting the sensor with suitable monitoring and/or control apparatus.

After the pressure signal passes the aperture 34 (having been exposed to diaphragm 52), it continues into the waveguide 28 as shown in FIG. 1. In order to prevent the formation of a standing wave at the Tee Probe holder/waveguide interface, the internal diameter of the waveguide 28 and the Tee Probe holder pressure signal passage 18 are identical.

When the dynamic pressure signal leaves the source location at the combustor 15 and travels down the inside of the metal tubing 90, it is gradually attenuated due to friction between the signal and the side walls of the tubing. As a result, the further down the tubing the signal travels, the more attenuation results. When the signal gets to the end of the tubing (including the damping coil 86), it is reflected from the end and starts to travel back towards the signal source. See FIG. 4. This system has been sized such that the distance from measurement point of the remote end of the acoustic damping system (see the distance D in FIG. 4) is sufficiently long to insure the signal will be completely damped away before it can travel back to the measurement point. Specifically, $D=L_2+n(2\pi R)$ where $L_2$ is the distance between the measurement point and the first coil 86, n is the number of individual coils or turns in the damping coil 86, and R is the radius of the coil 86. Also, the distance $L_1$ from the measurement point to the dynamic pressure source (FIG. 4) is kept to an absolute minimum so that at the point of measurement, a minimum amount of damping has occurred.

In order for this system to work continuously, it is also necessary to prevent condensation from forming in this coil system. If condensation does form in the coil system, it results in standing waves building up in the measurement systems, which prevents accurate measurement of the dynamic pressure signal. This design employs various mechanisms to prevent condensate formation in this acoustic damping system.

Figure 4:
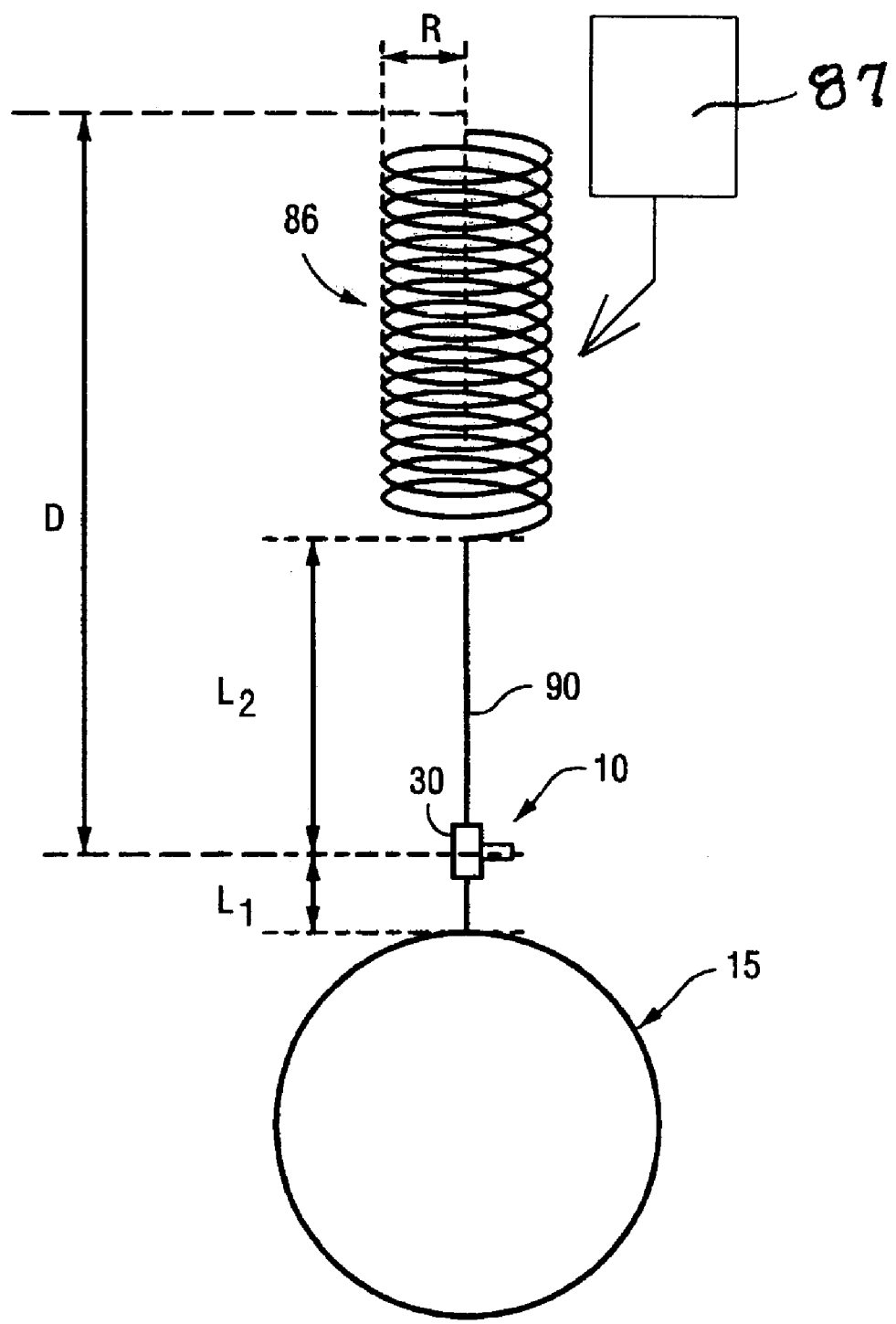
FIG. 4 is a schematic diagram illustrating spatial relationships between the dynamic sensor and acoustic damping system in accordance with the invention.

First, by winding the attenuation coil(s) 86 around a vertical axis as shown in FIG. 4, the tubing has a continuous positive slope downwards. The slope allows any condensation to flow back to the source of the dynamic pressure under gravity.

Second, the system also prevents condensate from forming by ensuring that the temperature inside the damping coils is high enough to prevent condensation (of any conventional type). This may be achieved by having a dedicated heat source 87 (see FIG. 4) close to the damping system to keep it hot or by locating the system in a location which is already hot enough and does not require additional heat to be supplied. For example, in the case of a gas turbine, the acoustic damping system can be strategically located inside the hot environment of the turbine compartment. This ensures that the air inside the coil system is kept sufficiently warm to prevent condensation from forming.

Third, passive continuous purging with hot air is an optional feature that can be used to prevent condensation if it is required. Specifically, and with reference to FIGS. 1 and 2, within the holder body 16, there is a second bore or passage 72 extending from the forward end thereof (with an inlet 74 where the forward extension 24 joins to the body 16 to an outlet bushing 76 generally aligned with the housing portion 30 and perpendicular to the passage 72. A tube 78 is secured within the outlet bushing 76 via compression fitting 82, and includes a bore 80 that communicates with bore 72. The inlet 74 is adapted to be located within the outer wall 16 of the combustor, such that the inlet is exposed to compressor discharge air in the radial space 84 between the outer wall 16 and liner 14. This second axial bore or passage 72 is provided in the event it is desired to extract compressor discharge air from the radial space 84 and to supply the compressor discharge air to the top side of the vertically wound attenuation coil 86 of the acoustic damping system 17 via bore 80 and stream 88. This hot compressor discharge air is used to provide a continuous passive purging of the vertically wound attenuation coil 86 and thereby prevent formation of any condensate in the attenuation coil. Additional coils are available as necessary to provide a similar function with respect to other combustors in a typical annular array of such combustors.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A dynamic pressure probe comprising a holder body having a first passage therein adapted to receive a pressure signal, a pressure sensor including at least a pressure sensing portion located within a sleeve seated within a pressure sensor housing portion, said sleeve engaged with a wall of said housing portion; said pressure sensor including a diaphragm having one face exposed to a pressure chamber within said sleeve between said pressure sensor and said wall; wherein an aperture in said wall of said housing connects said pressure chamber to said first passage; and wherein said first passage continues axially beyond said aperture in a flow direction to an acoustic damping coil wound about a vertical axis.

2. The probe of claim 1 wherein opposite ends of said sleeve are provided with O-ring seals for sealing said pressure chamber relative to said housing portion.

3. The probe of claim 1 wherein said sleeve includes a first diameter region in which the sensing portion of said pressure sensor is located, and a second larger diameter region in which said diaphragm is located.

4. The probe of claim 1 wherein said pressure chamber has an acoustic resonance frequency greater than a corresponding frequency of the pressure signal.

5. The probe of claim 1 wherein said first passage is substantially perpendicular to said sleeve and said pressure chamber.

6. The probe of claim 1 wherein a second passage is formed in said holder body, adapted to receive extracted compressor discharge air.

7. The probe of claim 6 wherein an inlet to said first passage is axially spaced from an inlet to said second passage.

8. The probe of claim 1 wherein said second passage is arranged to supply compressor discharge air to an opposite end of said acoustic damping coil.

9. The probe of claim 1 wherein said sensor includes a radial flange engaged with an outer edge of said sleeve.

10. The probe of claim 9 wherein said pressure sensing portion of said sensor is secured within said sleeve by means of a flange connector in compressive engagement with said radial flange.

11. The probe of claim 1 wherein said damping coil has an inside diameter substantially equal to an inside diameter of said first passage.

12. The probe of claim 1 wherein heating means are provided for raising the temperatures inside said damping coil sufficiently to prevent condensation from forming inside said coil.

13. The probe of claim 1 wherein a distance from the pressure sensor to an end of said damping coil is sufficient to insure complete damping of said pressure signal in a direction away from said signal.

14. A dynamic pressure probe comprising a holder body having a first passage therein adapted to receive a pressure signal, a pressure sensor including at least a pressure sensing portion located within a sleeve seated within a pressure sensor housing portion, said sleeve engaged with a wall of said housing portion; said pressure sensor including a diaphragm having one face exposed to a pressure chamber within said sleeve between said pressure sensor and said wall; wherein an aperture in said wall of said housing connects said pressure chamber to said first passage; and wherein heating means are provided for raising the temperatures inside said damping coil sufficiently to prevent condensation from forming inside said coil.

15. The dynamic pressure probe of claim 14 wherein said damping coil has an inside diameter substantially equal to an inside diameter of said first passage.

16. The dynamic pressure probe of claim 14 wherein a distance from the pressure sensor to an end of said damping coil is sufficient to insure complete damping of said pressure signal in a direction away from said signal.

17. A dynamic pressure probe comprising a holder body having a first passage therein adapted to receive a pressure signal, a pressure sensor including at least a pressure sensing portion located within a sleeve seated within a pressure sensor housing portion, said sleeve engaged with a wall of said housing portion; said pressure sensor including a diaphragm having one face exposed to a pressure chamber within said sleeve between said pressure sensor and said wall; wherein an aperture in said wall of said housing connects said pressure chamber to said first passage; and wherein a distance from the pressure sensor to an end of said damping coil is sufficient to insure complete damping of said pressure signal in a direction away from said signal.

18. The dynamic pressure probe of claim 17 wherein said sleeve includes a first diameter region in which the sensing portion of said pressure sensor is located, and a second larger diameter region in which said diaphragm is located.

* * * * *

UNITED STATES PATENT AND TRADEMARK OFFICE
CERTIFICATE OF CORRECTION

PATENT NO.    : 6,708,568 B2
DATED         : March 23, 2004
INVENTOR(S)   : Gleeson et al.

It is certified that error appears in the above-identified patent and that said Letters Patent is hereby corrected as shown below:

Column 6,
Line 18, insert -- ) -- after "to the body 16".

Signed and Sealed this

Eighth Day of June, 2004

JON W. DUDAS
*Acting Director of the United States Patent and Trademark Office*